Aug. 18, 1931.    T. STENHOUSE    1,819,446
GLASS FEEDER
Filed July 8, 1927
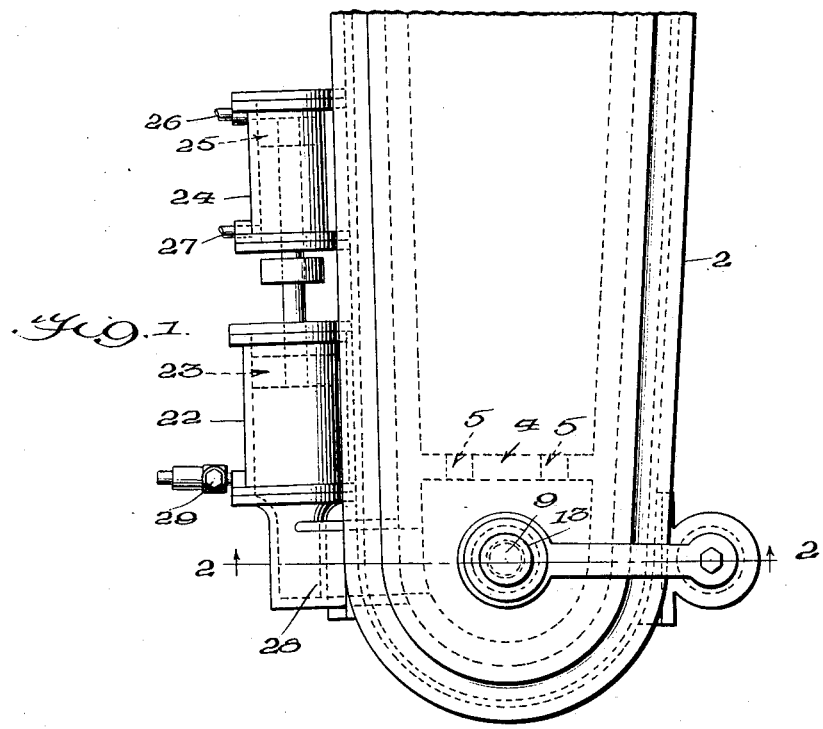
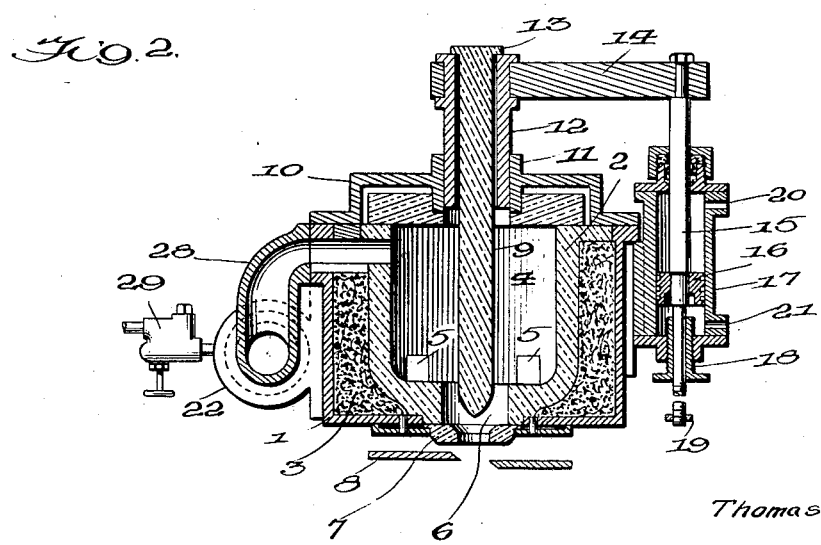
Inventor
Thomas Stenhouse,
By Eccleston & Eccleston
Attorneys Patented Aug. 18, 1931

1,819,446

UNITED STATES PATENT OFFICE

THOMAS STENHOUSE, OF WASHINGTON, PENNSYLVANIA, ASSIGNOR TO HAZEL-ATLAS GLASS CO., OF WHEELING, WEST VIRGINIA, A CORPORATION OF WEST VIRGINIA

GLASS FEEDER

Application filed July 8, 1927. Serial No. 204,234.

The invention relates generally to mechanism for feeding formed glass charges, and the object of the invention is to provide a combination of means, which by acting simultaneously or in any desired sequence, will produce a greater effect on the glass, during both extrusion and retraction, than has been possible with prior feeders, thereby increasing the flexibility of such prior known feeders.

The construction of the improved feeder, and the numerous advantages thereof, will be apparent to those skilled in the art, from the following detailed description, when taken in connection with the accompanying drawings; in which Figure 1 is a plan view of a single flow spout equipped with the improved feeder; and Figure 2 is a vertical transverse sectional view of the feeder mechanism, taken on line 2—2 of Figure 1.

Referring to the drawings more in detail, numeral 1 indicates the usual metallic casing for the ordinary flow spout 2, which is made of refractory material. Between the refractory walls of the flow spout and the casing, there may be a lining of heat insulation material 3, or if preferred, burners or other heating means may be substituted for the heat insulation material. It will be understood, of course, that the flow spout is mounted on and is in communication with the ordinary glass tank (not shown), so that the glass will flow from the refining end of the tank into the flow spout. While I have shown only one flow spout, it will be understood that the tank will be provided with any desired number thereof, in accordance with the well known practice.

Arranged transversely of the flow spout, intermediate its ends, is a wall 4, having submerged ports 5. The outer end portion of the flow spout, which is divided off from the remainder of the spout by the wall 4, is the pressure chamber, and the ports 5 are for the purpose of permitting glass to flow into the pressure chamber.

Numeral 6 refers to the usual flow orifice, having the ordinary removable bushing 7; the size of the bushing varying with different ware that is manufactured. Shears 8 are arranged below the flow orifice, and in the well known manner these shears sever the charge, thereby permitting it to fall into a mold, to be formed into the desired article. I have merely shown the shears diagrammatically, but it will be understood that in accordance with the established practice these shears are operated by compressed air cylinders; the operation of the shear cylinder and other cylinders of the feeder, being controlled by the usual timing shaft.

Arranged to reciprocate in the pressure chamber, in vertical alignment with the flow orifice, is a plunger 9 which, of course, is made of refractory material. This plunger may be reciprocated by any of the well known means, but in the present instance it is essential that the plug be so mounted that it may be reciprocated without affecting the air-tight condition of the pressure chamber. In the particular form illustrated herein, I mount a cover plate 10 over the refractory top of the pressure chamber, and provide this cover with a slide bearing 11, in vertical alignment with the flow orifice. A bushing 12 has a sliding fit in the bearing 11, and suspended by this bushing is the plug or plunger 9. Of course, the sliding connection between the bearing 11 and bushing 12 is air-tight, as is also the connection between the bushing 12 and the plunger 9. In the form shown, the air-tight connection between the bushing and plunger is accomplished by providing the upper end of the plunger with a flange 13, which fits down on the upper face of the bushing. The plunger is secured to the bushing by any desired means, and any preferred form of packing may be employed between the flange 13 of the plunger and the upper face of the bushing. There is not a tight fit between the body of the plunger and the bushing as plungers of various diameter are employed, depending on the particular ware being manufactured.

A bracket 14 has one end attached to the bushing 12, and the opposite end attached to a piston rod 15, which is operated by piston 16 in the cylinder 17. A sleeve 18 is preferably threaded in the lower end of cylinder 17, by the adjustment of which the lower limit of stroke of the piston 16 may be varied. And the piston rod 15 preferably extends on through the sleeve and has its lower end threaded to receive a nut 19, by the adjustment of which the upper limit of stroke of the piston 16 may be varied. While I have disclosed means for adjusting the limits of the plunger stroke, yet it will be understood that such adjustments are not essential to the successful operation of the feeder, as it is possible to meet all requirements by maintaining fixed the limits of the plunger stroke and varying the pressure or vacuum on the glass surface. The cylinder 17 is provided with the usual ports 20 and 21 which are connected with air lines; the admission and exhaust of air being controlled by valves operated at the desired time by any of the well known timing mechanisms in common use, or by the timing mechanism illustrated in my application Serial No. 204,233, filed July 8, 1927.

It will be understood, of course, that compressed air or other motive fluid, is alternately admitted to opposite ends of the cylinder 17, to reciprocate the piston 16, and thereby reciprocate the plunger 9 in vertical alignment with the flow orifice, to alternately accelerate and retard, stop or retract the flow of glass through the orifice, to form suspended gobs or charges, in the well known manner. It is apparent, however, that in the reciprocating plunger type of feeder, the effect of the plunger on the glass, either in accelerating, retarding or retracting the flow, is necessarily fixed within certain limits. That is, when the plunger reaches its downward limit of travel, its effect as an accelerating force necessarily ceases; and in the same way when the plunger has reached its upper limit of travel obviously it can have no further effect in retarding, stopping or retracting the flow of the glass. In the feeder disclosed herein, means is provided to render the feeder more flexible, so that an additional accelerating force may be applied to the surface of the glass after the plunger has spent its accelerating effect, or which may exert an accelerating effect on the glass before the plunger has started to exert its accelerating effect. In the same manner, by the means provided, an additional retarding effect may be applied to the glass after the plunger has spent its retarding effect, or which may exert a retarding effect before the plunger has started to exert its retarding effect.

This increased flexibility of feeder operation is accomplished by combining a pneumatic control with the plunger control. For this purpose I provide an air pump comprising the cylinder 22 and piston 23, which is operated by a cylinder 24 and piston 25. This cylinder 24 has ports 26 and 27 for alternately admitting and exhausting compressed air or other motive fluid to opposite ends of the cylinder; the operation of the cylinder being controlled by the usual timing shaft referred to hereinbefore, but not disclosed for the reason that timing shafts for operating feeders are well known and have been in general use for many years. A conduit 28 connects the air pump 22 with the upper end of the pressure chamber above the surface of the glass. An adjustable check valve 29 is associated with the air pump 22 and constitutes means for regulating the pressure. It will be understood that by the operation of the air pump alternate pressure and vacuum will be applied to the surface of the glass in the pressure chamber, to alternately accelerate and retard the flow of glass, in the well known manner.

It is believed that the operation of this improved feeder, and the advantages thereof, will be clearly understood from the foregoing description. It is apparent that the feeder is subject to a great variety of modes of operation. For example, the air pressure may be applied just before the plunger begins its down stroke, or after the plunger has begun its down stroke, or after the plunger has completed its down stroke, and in many other varieties of combinations. Likewise the vacuum may be applied just before the plunger begins its up stroke, or just after it has begun its up stroke, or after it has completed its up stroke, and in many other varieties of combinations. Likewise, air pressure alone may be employed for accelerating the flow of glass, while the vacuum and plunger may be used in combination to retard the flow; or the plunger alone may be employed for accelerating the flow of glass, while the vacuum and plunger may be used in combination to retard the flow of glass; or the plunger and pneumatic pressure may be used in combination to accelerate the flow of glass, while the plunger alone is employed to retard the flow; or the plunger and pneumatic pressure may be used to accelerate the flow of glass, while vacuum alone is employed to retard the flow, etc.

By reason of this flexibility of operation, together with the fact that the pressure may be applied simultaneously with the accelerating movement of the plunger, or the vacuum may be applied simultaneously with the retarding movement of the plunger, or the pressure may be applied as a continuation of the accelerating effect of the plunger, or the vacuum may be applied as a continuation of the retarding effect of the plunger, it is apparent that the present feeder gives a much wider control over the glass, as to weight, size and shape, than has been possible heretofore. By employing the two accelerating forces simultaneously the rapidity of flow will be greatly increased; and by employing the two retarding forces simultaneously, the retraction is increased, which is often desirable for reasons well known in this art. And, of course, by adding the accelerating effect of air pressure on the glass surface, after the plunger has spent its accelerating effect, prevents the attenuation of the charge or necking-in, which is peculiar to gravity flow after the arrest of the downward movement of the plunger. On the other hand, the attenuation or necking-in of the charge at the shearing point, which is often desirable, may be made more pronounced by the manipulation of the vacuum in proper timed relation to the lifting of the plunger.

While I have shown and described a specific construction, it will be understood that the invention is in no manner limited to the specific structure disclosed, but is subject to very wide modification, without departing from the spirit of the invention.

Having fully described the invention, what I claim as new, and desire to secure by Letters Patent is:

1. A glass feeder including a flow spout having a flow orifice, a plunger reciprocable in the flow spout in vertical alignment with the flow orifice, and means for reciprocating said plunger, said plunger having an air-tight connection with the flow spout.

2. A glass feeder including a flow spout having a flow orifice, a plunger reciprocable in the flow spout in vertical alignment with the flow orifice, a bushing having a sliding air-tight connection with the flow spout, said plunger mounted in said bushing and having an air-tight connection therewith, and means for reciprocating said bushing.

3. A glass feeder including a flow spout, a pressure chamber having a flow orifice, a plunger reciprocable in the pressure chamber in vertical alignment with the flow orifice, said plunger having an air-tight connection with the chamber, and means for varying the air pressure on the surface of the glass in the pressure chamber.

4. A glass feeder including a flow spout, a transverse wall in the flow spout transforming the outer end of the flow spout into a pressure chamber, said transverse wall having a submerged port to permit glass to flow into the pressure chamber, said pressure chamber having a flow orifice, a plunger reciprocable in vertical alignment with the flow orifice, and means for varying the air pressure on the glass in the flow spout.

5. A glass feeder including a flow spout, a pressure chamber having a submerged connection with the flow spout for the flow of glass, means for alternately creating a pressure and vacuum in said chamber, said chamber having a flow orifice, a plunger having an air-tight sliding connection with the chamber, and means for reciprocating the plunger in vertical alignment with the flow orifice.

6. A glass feeder including a flow spout, a pressure chamber having a submerged connection with the flow spout for the flow of glass, means for alternately creating a pressure and vacuum in said chamber above the glass therein, said chamber having a flow orifice, mechanical means having an air-tight connection with the chamber for alternately accelerating and retarding the glass flow, and shears for severing the formed charges.

7. A glass feeder including a flow spout, a pressure chamber having a flow orifice, a submerged passageway connecting the flow spout and the chamber, mechanical means having an air-tight connection with said chamber for alternately accelerating and retarding the flow of glass through the flow orifice, and pneumatic means for alternately accelerating and retarding the flow of glass through the flow orifice, the two means being operable in any desired relation.

8. A glass feeder including a flow spout and a pressure chamber having a flow orifice, the flow spout and pressure chamber being connected by a submerged orifice, mechanical means having a sliding air-tight connection with the chamber for accelerating the flow of glass through the flow orifice, and pneumatic means for accelerating the flow of glass through the flow orifice, said two means being operable in any desired order.

9. A glass feeder including a flow spout and a pressure chamber having a flow orifice, the flow spout and pressure chamber being connected by a submerged orifice, mechanical means having an air-tight connection with the chamber for retarding the flow of glass through the flow orifice, and pneumatic means for retarding the flow of glass through the flow orifice, said two means being operable in any desired order.

THOMAS STENHOUSE.